United States Patent
O'Dougherty et al.

(10) Patent No.: US 7,664,568 B2
(45) Date of Patent: *Feb. 16, 2010

(54) LIQUID HANDLING SYSTEM WITH ELECTRONIC INFORMATION STORAGE

(75) Inventors: Kevin T. O'Dougherty, Arden Hills, MN (US); Robert Andrews, Hudson, MA (US)

(73) Assignee: Advanced Technology Materials, Inc., Danbury, CT (US)

( * ) Notice: Subject to any disclaimer, the term of this patent is extended or adjusted under 35 U.S.C. 154(b) by 883 days.

This patent is subject to a terminal disclaimer.

(21) Appl. No.: 11/074,408

(22) Filed: Mar. 8, 2005

(65) Prior Publication Data

US 2005/0177274 A1 Aug. 11, 2005

Related U.S. Application Data

(63) Continuation of application No. 09/880,472, filed on Jun. 13, 2001, now Pat. No. 6,879,876.

(51) Int. Cl.
*G06F 17/00* (2006.01)
(52) U.S. Cl. .............. 700/231; 700/239; 700/244; 700/265; 700/266; 700/281; 73/866.5
(58) Field of Classification Search ............ 700/105, 700/110, 230, 231, 239, 244, 265–273, 281–285; 73/866.5; 174/47; 137/177, 251.1, 798; 455/66; 324/637, 639, 663; 705/45–55; 340/618, 620, 572.1–572.9
See application file for complete search history.

(56) References Cited

U.S. PATENT DOCUMENTS

| | | | |
|---|---|---|---|
| 4,951,512 A | 8/1990 | Mazza et al. | |
| 5,014,208 A | 5/1991 | Wolfson | |
| 5,102,010 A | * 4/1992 | Osgar et al. | ............ 222/1 |

(Continued)

FOREIGN PATENT DOCUMENTS

JP 2002181296 A 6/2002

(Continued)

OTHER PUBLICATIONS

Lorefice, Bob, et al., How to Minimize Resist Usage During Spin Coating, Semiconductor International; found online Sep. 29, 2006 at http://www.reed-electronics.com/semiconductor/article/CA1840747?pubdate=6%2F1%2F1998, Jun. 1, 1998, Publisher: Reed Business Information.

(Continued)

*Primary Examiner*—Jeffrey A Shapiro
(74) *Attorney, Agent, or Firm*—Vincent K. Gustafson; Intellectual Property/Technology Law; Maggie Chappuis (57) ABSTRACT

The present invention is a system for handling liquid and a method for the same. The system has a container capable of holding a liquid. An electronic storage device is coupled with the container for electronically storing information relating to the liquid stored in the container. The system also has an antenna, for storing information to and reading information from the electronic storage device. Finally, the system has a microprocessor-based controller, coupled with the antenna, for controlling processing of the liquid based on information read from the electronic storage device by the antenna.

53 Claims, 4 Drawing Sheets

U.S. PATENT DOCUMENTS

| | | |
|---|---|---|
| 5,223,796 A | 6/1993 | Waldman et al. |
| 5,385,060 A | 1/1995 | Wang |
| 5,524,794 A | 6/1996 | Benedetti, Jr. et al. |
| 5,539,188 A | 7/1996 | Fallah et al. |
| 5,558,083 A | 9/1996 | Bathe et al. |
| 5,594,162 A | 1/1997 | Dolan et al. |
| 5,604,681 A | 2/1997 | Koeninger |
| 5,627,517 A | 5/1997 | Thelmer et al. |
| 5,635,652 A | 6/1997 | Beaudin |
| 5,638,285 A | 6/1997 | Newton |
| 5,651,402 A | 7/1997 | McCaul |
| 5,737,221 A | 4/1998 | Newton |
| 5,744,696 A | 4/1998 | Wang et al. |
| 5,802,859 A | 9/1998 | Zugibe |
| 5,803,673 A | 9/1998 | Reinsch et al. |
| 5,852,590 A | 12/1998 | De La Huerga |
| 5,875,921 A | 3/1999 | Osgar et al. |
| 5,883,376 A | 3/1999 | Rosch et al. |
| 5,893,263 A | 4/1999 | Matsumoto et al. |
| 5,940,780 A * | 8/1999 | Azar et al. .................... 702/91 |
| 5,942,980 A | 8/1999 | Hoben et al. |
| 5,949,049 A | 9/1999 | McCarrick et al. |
| 5,953,682 A | 9/1999 | McCarrick et al. |
| 5,955,684 A | 9/1999 | Gravel et al. |
| 6,065,638 A | 5/2000 | Terranova et al. |
| 6,067,844 A | 5/2000 | Westbrook et al. |
| 6,140,146 A | 10/2000 | Brady et al. |
| 6,147,662 A | 11/2000 | Grabau et al. |
| 6,161,706 A | 12/2000 | McCord |
| 6,165,347 A | 12/2000 | Warburton |
| 6,206,240 B1 * | 3/2001 | Osgar et al. .................... 222/39 |
| 6,209,592 B1 | 4/2001 | Gilboa et al. |
| 6,234,006 B1 | 5/2001 | Sunshine et al. |
| 6,271,753 B1 | 8/2001 | Shukla |
| 6,275,746 B1 | 8/2001 | Leatherman et al. |
| 6,281,787 B1 | 8/2001 | Lerg et al. |
| 6,282,458 B1 | 8/2001 | Murayama et al. |
| 6,318,568 B1 | 11/2001 | McCord |
| 6,405,745 B1 | 6/2002 | Kar et al. |
| 6,446,644 B1 * | 9/2002 | Dolechek .................. 134/57 R |
| 6,516,249 B1 | 2/2003 | Hoyle et al. |
| 6,524,774 B1 | 2/2003 | Sonderman |
| 6,542,848 B1 | 4/2003 | Neeser et al. |
| 6,545,592 B2 | 4/2003 | Weiner |
| 6,556,027 B2 | 4/2003 | Banks |
| 6,556,832 B1 * | 4/2003 | Soliman ................ 342/357.06 |
| 6,556,889 B2 | 4/2003 | Rudick et al. |
| 6,556,949 B1 | 4/2003 | Lyon |
| 6,558,620 B1 | 5/2003 | Sanford et al. |
| 6,571,151 B1 | 5/2003 | Leatherman |
| 6,592,043 B1 | 7/2003 | Britton |
| 6,597,175 B1 | 7/2003 | Brisco |
| 6,618,714 B1 | 9/2003 | Abrahams |
| 6,633,796 B1 | 10/2003 | Pool et al. |
| 6,642,897 B2 * | 11/2003 | Forster et al. ............... 343/767 |
| 6,649,829 B2 | 11/2003 | Garber et al. |
| 6,672,341 B2 | 1/2004 | Bartholomew et al. |
| 6,698,619 B2 | 3/2004 | Wertenberger et al. |
| 6,720,866 B1 * | 4/2004 | Sorrells et al. ............. 340/10.4 |
| 6,732,945 B2 * | 5/2004 | Dolechek ..................... 239/65 |
| 6,843,414 B2 * | 1/2005 | Madrid et al. ............... 235/385 |
| 6,879,876 B2 * | 4/2005 | O'Dougherty et al. ...... 700/231 |
| 2001/0052465 A1 | 12/2001 | Dordi et al. |
| 2002/0078363 A1 * | 6/2002 | Hill et al. .................... 713/189 |
| 2003/0004606 A1 | 1/2003 | O'Dougherty et al. |
| 2004/0172160 A1 * | 9/2004 | O'Dougherty et al. ...... 700/231 |

FOREIGN PATENT DOCUMENTS

| | | |
|---|---|---|
| JP | 2003139864 A | 5/2003 |
| WO | WO00/54724 | 9/2000 |

OTHER PUBLICATIONS

U.S. Appl. No. 10/139,185, filed May 3, 2002, Chilcoate, et al.
Philips Semiconductor, mifare System Overview, Dec. 1998.
Philips Semiconductor, Controllers for High Security, Crypto and Dual Interface Smart Cards, Mar. 1999.

* cited by examiner

LIQUID HANDLING SYSTEM WITH ELECTRONIC INFORMATION STORAGE

CROSS-REFERENCE TO RELATED APPLICATION(S)

This application is a continuation of U.S. patent application No. 09/880,472, filed on Jun. 13, 2001, subsequently issued as U.S. Pat. No. 6,879,876 on Apr. 12, 2005, which patent is hereby incorporated by reference.

BACKGROUND OF THE INVENTION

This invention relates to a storage and dispensing system for the storage and dispensing of liquids. In particular, the invention relates to using a radio frequency identification tag and a radio frequency antenna to assure proper association of a particular liquid to a particular process.

Certain manufacturing processes require the use of liquid chemicals such as acids, solvents, bases, photoresists, dopants, inorganic, organic and biological solutions, pharmaceuticals, and radioactive chemicals. Often, these processes require a specific liquid chemical for each particular process. Furthermore, each process may require a specific liquid chemical at various stages of the process. Storage and dispensing systems allow alternative containers to be used to deliver liquid chemicals to a manufacturing process at a specified time. Consequently, manufacturing personnel need to change the liquid chemical being used for the particular process at the specified time so that the system delivers the correct liquid chemical to the manufacturing process. It is critical that the proper liquid chemical be installed into the systems for the particular process. If the incorrect liquid chemical is installed for a particular process, personnel may be put at risk. Furthermore, equipment and the articles under manufacture may be severely damaged.

Prior art systems have attempted to utilize unique pump connectors that will only fit with a correct container. Each container has a unique configuration based on the liquid chemical contained therein. The intention is that only the correct chemical can be used in any particular manufacturing process, because the process will dictate a unique pump connection and a corresponding container with the correct chemical liquid. One example of such a system is disclosed in Osgar et al., "Liquid Chemical Dispensing System With Sensor," U.S. Pat. No. 5,875,921. The Osgar system uses physical configurations, called key codes, to prevent accidental dispensing of an improper liquid from a container. Both the container and a connector have unique key code configurations. The connector must have the same key code configuration as the container for the connector to be properly coupled with the container. The Osgar system also employs a sensor that senses proper coupling of the connector to the container. When the sensor senses a proper coupling of the connector to the container, a pump is enabled. When the container and the connector are not properly coupled, the pump is disabled.

Some prior art systems, however, do allow the pump connectors to be partially connected to the incorrect chemicals such that pumping can take place even though the connection is not proper. In addition, personnel have a propensity to attach the wrong chemical to the wrong process or at the wrong time. Such incorrect connections can be dangerous to personnel and have caused millions of dollars of damage to equipment and to articles of manufacture. A system that could provide a reliable connection between the correct chemical and the correct process, and that could track incorrect connection attempts by personnel would be a useful improvement over the prior systems.

SUMMARY OF THE INVENTION

The present invention is a system for handling liquid and a method for the same. The system has a container capable of holding a liquid. A storage means is coupled with the container for electronically storing information relating to the liquid stored in the container. The system also has a communication means, for storing information to and reading information from the storage means. Finally, the system has a controller means, coupled with the communication means, for controlling processing of the liquid based on information read from the storage means by the communication means.

In a preferred embodiment, a cap is also coupled with the opening such that the liquid is sealed in the container. A radio frequency identification (RFID) tag is mounted on the cap which is capable of electronically storing information. The RFID tag comprises a passive RF transponder and an electrically erasable programmable read-only memory (EEPROM). A connector is coupled with the cap such that the liquid can be dispensed from the container through the connector. A radio frequency (RF) antenna is mounted on the connector which stores information to and reads information from the EEPROM on the RFID tag. A microprocessor-based controller is coupled with the RF antenna such that the controller controls processing the liquid from the container based on information read from the RFID tag by the RF antenna.

In another preferred embodiment, the connector further comprises a connector head and a probe extending from the connector head. The probe is insertable through a center of the cap and into the opening. The probe has a flow passage. A pump is coupled with the probe and with the flow passage for pumping liquid through the probe and the flow passage.

DETAILED DESCRIPTION

Figure 1:
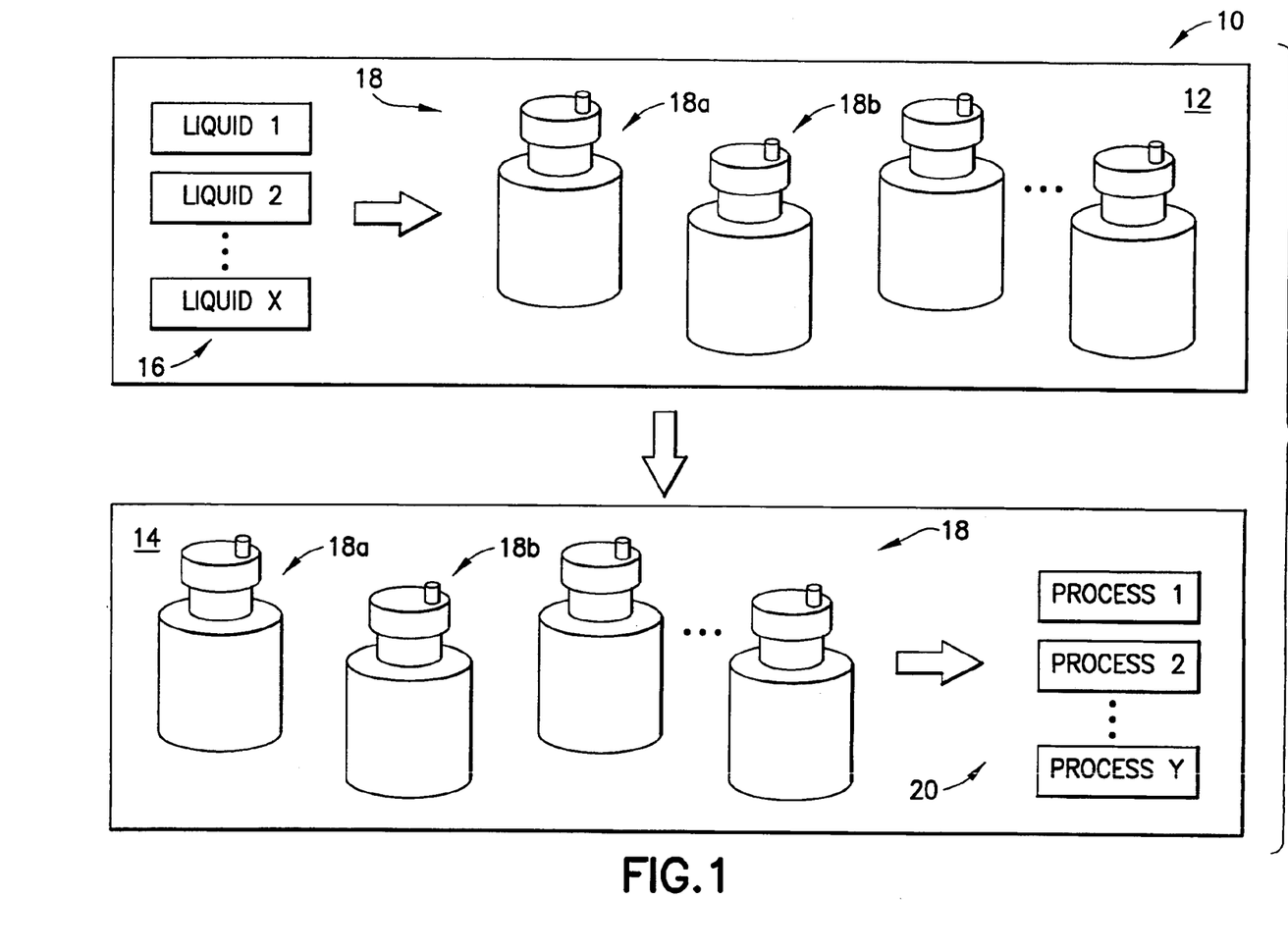
FIG. 1 shows a system for storing, dispensing and processing liquids in accordance with the present invention.

FIG. 1 shows system 10 for storing, dispensing and processing liquids in accordance with the present invention. System 10 includes filling system 12 and processing system 14.

Filling system 12 includes a plurality of liquids 16 and containers 18. In operation of filling system 12, liquids 16 are dispensed into containers 18. Liquids 16 are typically liquid chemicals including acids; solvents; bases; photoresists; dopants; inorganic, organic, and biological solutions; pharmaceuticals; and radioactive chemicals. Filling system 12 tracks which of liquids 16 is placed into which containers 18 so that liquids 16 in containers 18 can be identified later, as will be discussed more fully below. After filling of containers 18 has been completed, containers 18 are transported to processing system 14.

Processing system 14 includes a plurality of containers 18 and processes 20. In operation of processing system 14, liquids 16 contained in containers 18 are used in processes 20.

For example, containers 18 may contain a liquid chemical such as photoresist for use in the manufacturing of integrated circuits. Processing system 14 reads containers 18 to determine which liquids 16 are contained within them so that the proper liquid 16 is used in the proper process 20, as will be discussed more fully below.

Figure 2:
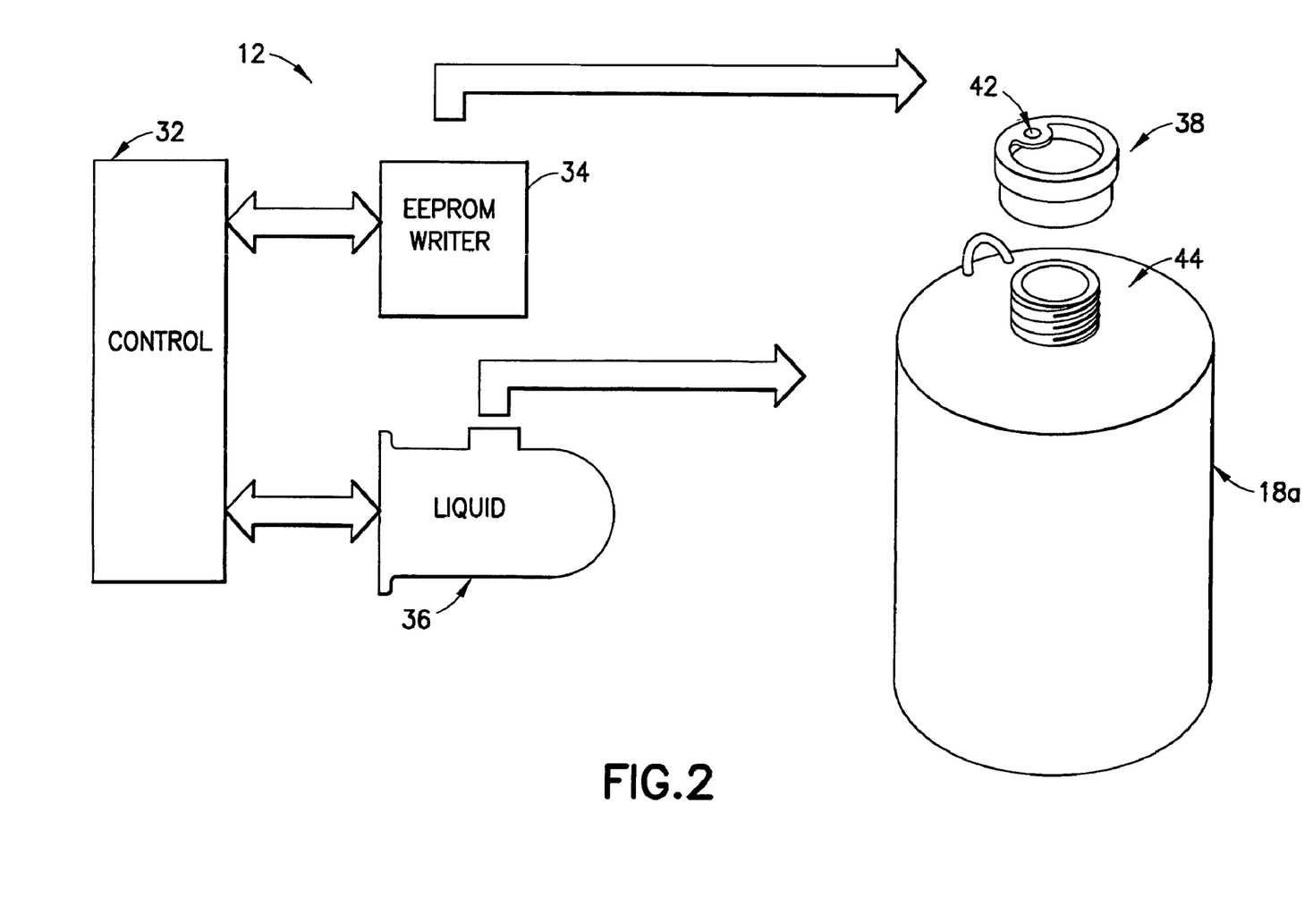
FIG. 2 shows a filling system for filling a container with liquid.

FIG. 2 shows filling system 12 for filling a container with liquid. Filling system 12 includes microprocessor-based control unit 32, electrically erasable programmable read-only memory (EEPROM) writer 34, liquid reservoir 36, cap 38, and container 18a. Control unit 32 is electrically connected to EEPROM writer 34 and liquid reservoir 36. Liquid reservoir 36 is connected to container 18a. Cap 38 includes radio frequency identification (RFID) tag 42. RFID tag 42 includes an EEPROM and a passive radio frequency transponder. EEPROM writer 34 is capable of writing to RFID tag 42 on cap 38.

In operation of filling system 12, control unit 32 regulates dispensing of liquid from liquid reservoir 36 into container 18a. Typically, filling system 12 includes a plurality of liquid reservoirs 36 connected to control unit 32. That is, control unit 32 typically regulates dispensing of a plurality of liquids into a plurality of containers 18. For ease of illustration, a single liquid reservoir 36 and a single container 18a are shown. To begin operation of filling system 12, control unit 32 sends a signal to liquid reservoir 36 instructing liquid reservoir 36 to begin dispensing liquid into container 18a. Liquid reservoir 36 continues dispensing liquid into container 18a until container 18a is filled to an appropriate level. After container 18a is filled, liquid reservoir 36 sends a signal to control unit 32 indicating container 18a is full. Control unit 32 then sends a signal to liquid reservoir 36 to stop dispensing liquid into container 18a.

After container 18a is filled, control unit 32 sends a signal to EEPROM writer 34. This signal contains information about liquid contained in liquid reservoir 36. EEPROM writer 34 subsequently programs the EEPROM contained in RFID tag 42 with information received from control unit 32 in a process known to the art. Information programmed to the RFID tag 42 includes, for example, the type of liquid dispensed into container 18a from liquid reservoir 36, the producer of the liquid contained in liquid reservoir 36, the date of filling of container 18a with liquid from liquid reservoir 36, the date of expiration of the liquid contained in container 18a, and similar useful information. Once container 18a has been filled and RFID tag 42 has been programmed by EEPROM writer 34, cap 38 is secured onto container opening 44 of container 18a. In a preferred embodiment, cap 38 is threadably connected to container opening 44 of container 18. Cap 38 may also be secured onto container opening 44 by, for example, snapping cap 38 onto container opening 44 or vacuum sealing cap 38 onto container opening 44. The method of securing cap 38 onto container opening 44 depends on the properties of the liquid contained in container 18a. After cap 38 has been secured onto container 18a, container 18a is transported to a processing system.

Figure 3:
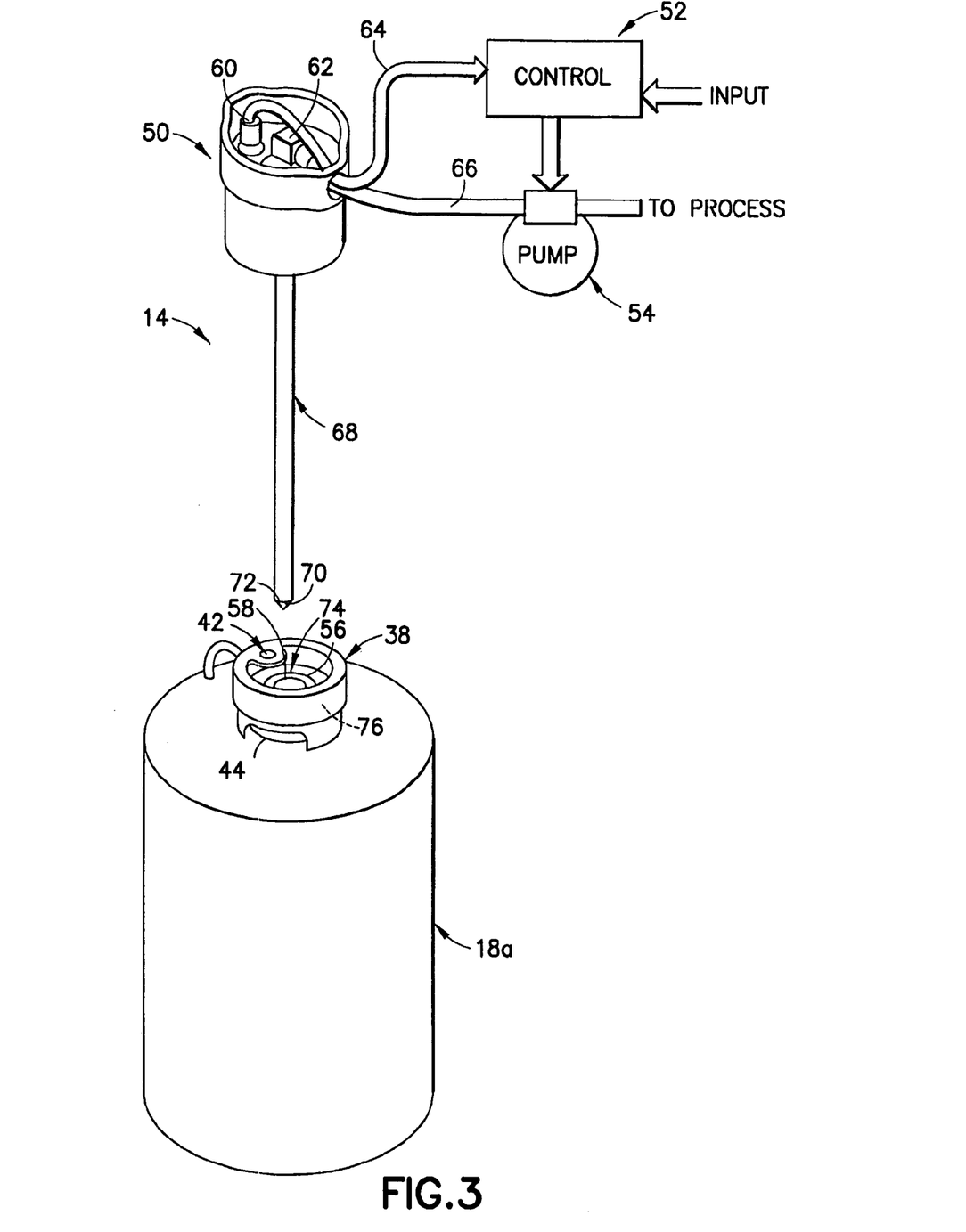
FIG. 3 shows a preferred embodiment of a processing system for dispensing and processing liquid.

FIG. 3 shows a preferred embodiment of processing system 14. Processing system 14 includes cap 38, container 18a, connector 50, control unit 52, and pump 54. Container 18a includes container opening 44. Cap 38 includes RFID tag 42, rupturable membrane 56, and membrane scores 58. Connector 50 includes radio frequency (RF) antenna 60, port adaptor 62, modular antenna line 64, adaptor tube 66, and probe 68. Probe 68 includes lower probe port 70 located adjacent probe tip 72. In a preferred embodiment, cap 38 is threadably connected to container opening 44 of container 18a. After container 18a with cap 38 are transported to the desired location, probe hole 74 and vent hole 76 are exposed. Rupturable membrane 56 is exposed through probe hole 74. Rupturable membrane 56 has membrane scores 58 in its surface. Connector 50 is configured to be interconnected with cap 38.

FIG. 3 shows how the components of processing system 14 are assembled. More specifically, connector 50 is shown being interconnected with cap 38 and container 18a. Probe tip 72 is inserted through probe hole 74 and pressed against rupturable membrane 56 proximate to membrane scores 58. When sufficient pressure is applied on connector 50 toward rupturable membrane 56, probe tip 72 ruptures rupturable membrane 56 along membrane scores 58 allowing probe 68 to be inserted through membrane 56. Continued pressure on connector 50 then allows connector 50 to be moved immediately adjacent cap 38. Probe 68 is then in communication with the interior of container 18a. As such, connector 50 is mounted on container 18a. Adapter tube 66 and port adapter 62 provide a liquid passage from the interior of container 18a to pump 54. When processing system 14 is properly assembled, pump 54 is capable of pumping the liquid in container 18a through port adapter 62 and adapter tube 66 to a manufacturing process, such as the manufacturing of integrated circuits. Typically, processing system 14 includes a plurality of containers 18, a plurality of connectors 50, and a plurality of pumps 54 connected to control unit 52. That is, control unit 52 typically regulates dispensing of liquid from a plurality of containers 18 to a plurality of processes via a plurality of pumps 54. For ease of illustration, a single connector 50, a single container 18a, and a single pump 54 are shown.

The operation of pump 54 is controlled by control unit 52. Control unit 52 may receive input from an operator relating to starting and stopping pump 54. For example, an operator seeking to start pumping the liquid chemical in container 18a to a manufacturing process may input this information to control unit 52.

Control unit 52, however, is also configured to receive signals from RF antenna 60 via either modular antenna line 64 or RF transmissions. In operation of processing system 14, control unit 52 receives input from a process indicating a liquid needed by the process. For example, in the manufacture of integrated circuits, a layer of photoresist may be needed. Control unit 52 sends a signal to RF antenna 60. Probe 68 of connector 50 is then inserted through probe hole 74 until connector 50 is immediately adjacent to cap 38. Connector 50 is positioned such that RF antenna 60 is located adjacent RFID tag 42. A signal requesting the information stored in the EEPROM of RFID tag 42 is then transmitted from RF antenna 60 to RFID tag 42. The signal is received by the passive RF transponder contained in RFID tag 42. The signal received by the transponder activates RFID tag 42. Subsequently, information stored on the EEPROM contained in RFID tag 42 is read from the EEPROM to the transponder. The transponder then transmits the information contained on the EEPROM to RF antenna 60. RF antenna 60 sends the information received from RFID tag 42 to control unit 52 via modular antenna line 64 or via a RF transmission. Control unit 52 compares information received from RF antenna 60 to information about the liquid needed by the process, and controls pump 54 accordingly. That is, if container 18a contains an undesired or unexpected liquid, control unit 52 will disable pump 54. Conversely, if container 18 contains an expected and desired liquid, control unit 52 will enable pump 54.

Consequently, when processing system 14 is not properly assembled and an operator, believing that processing system 14 is properly assembled, inputs information to start pump 54, pump 54 will not operate. In this way, processing system 14 prevents the accidental operation of an improperly assembled system. This will prevent delivery of an improper liquid to a process.

Figure 4:
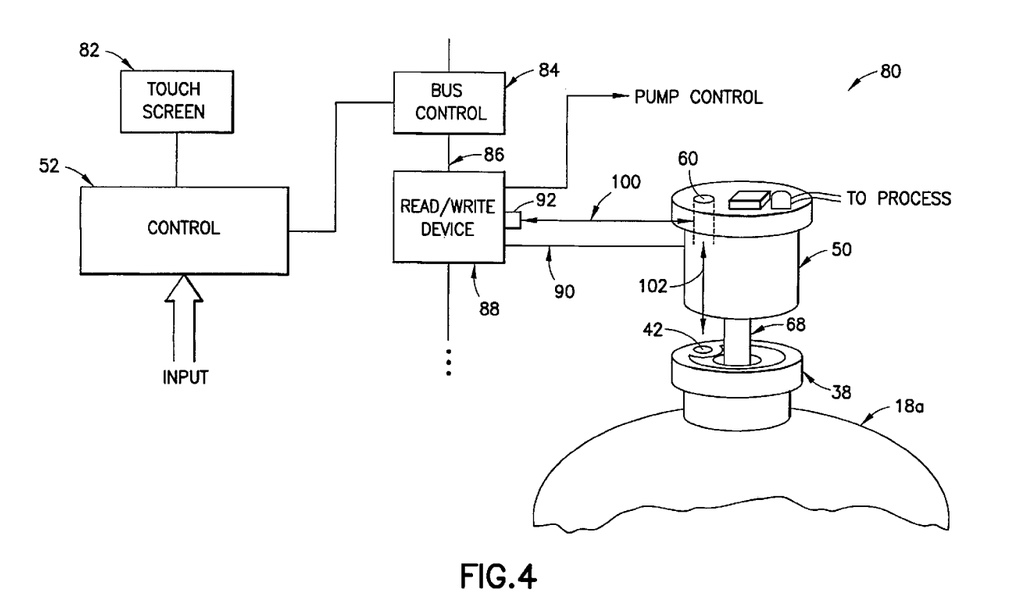
FIG. 4 shows a user-interface in the processing system for dispensing and processing liquid shown in FIG. 3.

FIG. 4 shows a preferred embodiment of user-interface 80 in processing system 14 for dispensing and processing liquid shown in FIG. 3. User interface 80 includes touch screen 82, microprocessor-based control unit 52, bus control unit 84, communication bus 86, read/write devices 88, connector 50, cap 38, and container 18a. Touch screen 82 is connected to control unit 52. Control unit 52 is connected to bus control unit 84, typically via an Ethernet or other serial communications cable. Control unit 52 also receives input from a process. Bus control unit 84 is connected to read/write device 88 via communication bus 86. Read/write device 88 is connected to connector 50 via modular antenna line 90. Read/write device 88 may also communicate with connector 50 through remote antenna 92. Connector 50 communicates with RFID tag 42 on cap 38 via RF antenna 60 using radio frequency transmissions.

For simplicity of illustration, FIG. 4 shows a single connector 50 connected to communication bus 86 through read/write device 88. In a typical system, a plurality of read/write devices 88 are connected to communication bus 86, each read/write device 88 connected to different connectors 50 coupled with containers 18 containing different liquids. Containers 18 are typically situated in a plurality of drawers, each drawer containing a plurality of positions. Each position is configured to hold one container 18. In operation of user-interface 80, each of containers 18 is graphically displayed on touch screen 82 in its corresponding drawer and position within the drawer. For example, in a system having two drawers and four positions within each drawer, container 18a positioned in the second position of the first drawer is graphically displayed on touch screen 82 in the second position of the first drawer. When connector 50 is matched properly with container 18a (as described above), the graphic representation of container 18a on touch screen 82 is displayed in a first color, typically green. This indicates to an operator that the liquid contained in container 18a is ready for dispensing to a process. Conversely, if connector 50 is matched improperly with container 18a (as described above), the graphic representation of container 18a on touch screen 82 is displayed in a second color, typically red, and a warning message appears on touch screen 82. This indicates to the operator that the liquid contained in container 18a will not dispense to a process until the mismatch is corrected.

When container 18a needs to be replaced (for example, when container 18 is empty), the operator removes container 18a from its position. Touch screen 82 then graphically displays container 18a, along with the drawer number and position number of container 18a. The operator then exchanges container 18a for new container 18b, and couples connector 50 with new container 18b. If connector 50 is matched properly with new container 18b (as described above), all containers 18 are displayed on touch screen 82 in the first color. If connector 50 is matched improperly with new container 18b (as described above), new container 18b is displayed on touch screen 82 in the second color and a warning message appears on touch screen 82.

Touch screen 82 also allows the operator to choose from a variety of operations using RFID tag 42. Each operation is selectable from a button on touch screen 82 which corresponds to each operation. For example, an operator may view information stored on RFID tag 42 about liquid contained in containers 18, record information to RFID tag 42 about liquid in containers 18 (such as when the liquid is installed into its proper drawer and position, the shelf life of the liquid, what process the liquid is used in, when the liquid is used in a process, how much of the liquid is used in a process, etc.), or enable probe 68 for dispensing liquid from containers 18. The operator touches the button on touch screen 82 corresponding to a desired operation. Touch screen 82 sends the selection made by the operator to control unit 52. Control unit 52 subsequently commands bus control unit 84 to perform the selected operation. The selected operation is performed, and the result is displayed on touch screen 82.

As an example, the operator may desire to view information stored on RFID tag 42 about liquid in container 18a. The operator first pushes the button on touch screen 82 corresponding to this operation. Touch screen 82 sends this selection to control unit 52. Control unit 52 then commands bus control unit 84 to access RFID tag 42 on container 18a. To access RFID tag 42, bus control unit 84 sends a signal along communication bus 86 to the read/write device accessing RFID tag 42: read/write device 88. Read/write device 88 then accesses RF antenna 60, either via modular antenna line 90 or a RF transmission via antenna 92. In this preferred embodiment, separation 100 between antenna 92 and RF antenna 60 is typically less than five meters for successful RF communication. Next, RF antenna 60 transmits a signal to RFID tag 42. In this preferred embodiment, separation 102 between RF antenna 60 and RFID tag 42 is typically less than ten millimeters for successful RF communication. The signal is received by the passive RF transponder contained in RFID tag 42. The signal activates RFID tag 42 and the requested information is accessed from the EEPROM contained on RFID tag 42. The requested information is then read from the EEPROM by the transponder, and the transponder transmits the information back to RF antenna 60. RF antenna 60 then sends the information to read/write device 88 either via modular antenna line 90 or via RF transmissions to antenna 92. The information is sent along communication bus 86 to bus control unit 84, which in turn sends the information to control unit 52. Once received by control unit 52, information about the liquid in container 18a is displayed on touch screen 82.

The liquid dispensing system of the present invention prevents the accidental operation of an improperly assembled system by storing liquid in a container having a cap with a radio frequency identification tag containing electrically erasable programmable read-only memory. (EEPROM). The EEPROM stores information about the liquid contained in the container. In a processing system, the information contained on the EEPROM can be accessed to prevent the accidental dispensing of an improper liquid and to maintain a database of the liquids used in a process. Also, additional information about the liquid can be written to the EEPROM in the processing system, such as when the liquid is used in a process and how much of the liquid is used in a process. Furthermore, the present invention allows for a standardization of the cap, container, and connector, since the control system now responds to information read from the cap rather than upon sensing a physical connection. This allows for a reduction in the amount of hardware that was necessary to accommodate the physical connectability safety feature of prior art systems.

Although the present invention has been described with reference to preferred embodiments, workers skilled in the art will recognize that changes may be made in form and detail without departing from the spirit and scope of the invention. For example, other forms of electronic storage may be used on RFID tag 42, such as erasable programmable read-only memory (EPROM), programmable read-only memory (PROM), and random-access memory (RAM). Also, the components of processing system 14 which communicate using radio frequencies may be configured to communicate using other areas of the electromagnetic spectrum, such as those in the areas of cellular or infrared communications.

The invention claimed is:

1. A liquid handling system comprising:
   a container adapted to hold a liquid and defining a container opening;
   a cap securable to the container proximate to the container opening, the cap including a radio frequency identification tag and adapted, when secured to the container, to seal the container for containment of liquid therein; and
   a connector including a connector head and a connector probe extending therefrom, the probe having a liquid flow passage therethrough such that the connector is adapted to deliver a flow of liquid from the container through the probe when the connector is engaged with the cap, the connector head including an antenna adapted to communicate (i) with the radio frequency identification tag when the connector head is engaged with the cap, and (ii) with a controller arranged to control dispensation of liquid from the container through the probe in accordance with information received via the antenna from the radio frequency identification tag.

2. The liquid handling system of claim 1, wherein the radio frequency identification tag comprises a passive radio frequency transponder.

3. The liquid handling system of claim 1, wherein the radio frequency identification tag comprises an EEPROM.

4. The liquid handling system of claim 1, wherein the antenna is adapted to both read information from the radio frequency identification tag and store information to the radio frequency identification tag.

5. The liquid handling system of claim 1, wherein the cap comprises a frangible sealing element disposed across or adjacent to a probe receiving aperture defined in the cap.

6. The liquid handling system of claim 5, wherein the frangible sealing element comprises a rupturable membrane.

7. The liquid handling system of claim 1, wherein the container comprises an interior surface, and contains a liquid contacting the interior surface.

8. The liquid handling system of claim 1, wherein the probe has a length, the container has a depth, and the probe length is approximately equal to the container depth.

9. The liquid handling system of claim 1, wherein when the connector head is engaged with the cap, the antenna is vertically aligned with the radio frequency identification tag.

10. The liquid handling system of claim 1, wherein when the connector head is engaged with the cap, the antenna is disposed less than 10 millimeters apart from the radio frequency identification tag.

11. The liquid handling system of claim 1, further comprising the controller and a process tool, wherein the controller is adapted to communicate with the process tool.

12. The liquid handling system of claim 11, wherein the process tool comprises an integrated circuit fabrication process tool.

13. A liquid handling system comprising:
    a container adapted to hold a liquid and defining a container opening; and a cap securable to the container proximate to the container opening and including a radio frequency identification tag, the cap (i) being arranged when secured to the container to seal the container for containment of liquid therein, and (ii) being adapted to engage a connector having a connector head including an antenna and a flow passage-defining dispensation probe extending from the head and adapted to extract liquid from the container when the connector is engaged to the cap;
    wherein the radio frequency identification tag and antenna are adapted to permit information stored in the tag to be received by the antenna when the connector head is engaged with the cap so that the antenna can communicate with a controller arranged to control dispensation of liquid from the container through the probe in accordance with information received via the antenna from the radio frequency identification tag.

14. The liquid handling system of claim 13, further comprising the connector.

15. The liquid handling system of claim 13, wherein the antenna is adapted to both read information from the radio frequency identification tag and store information to the radio frequency identification tag.

16. The liquid handling system of claim 13, wherein the cap comprises a frangible sealing element disposed across or adjacent to a probe receiving aperture defined in the cap.

17. The liquid handling system of claim 14, wherein when the connector head is engaged with the cap, the antenna is vertically aligned with the radio frequency identification tag.

18. The liquid handling system of claim 14, wherein when the connector head is engaged with the cap, the antenna is disposed less than 10 millimeters apart from the radio frequency identification tag.

19. The liquid handling system of claim 13, further comprising the controller and a process tool, wherein the controller is adapted to communicate with the process tool.

20. The liquid handling system of claim 19, wherein the process tool comprises an integrated circuit fabrication process tool.

21. A liquid handling system comprising:
    a container adapted to hold a liquid and defining a container opening;
    a cap securable to the container proximate to the container opening and including an electronic information storage element, the cap being arranged to engage a connector having (i) a connector head, (ii) a flow passage defined therethrough, and (iii) an electronic information retrieval element, wherein when the connector head is engaged with the cap, the electronic information storage element is disposed less than 10 millimeters apart from the electronic information retrieval element to permit communication therebetween.

22. The liquid handling system of claim 21, further comprising the connector.

23. The liquid handling system of claim 21, wherein the electronic information storage element comprises a radio frequency identification tag.

24. The liquid handling system of claim 21, wherein the electronic information storage element comprises a passive transponder.

25. The liquid handling system of claim 21, wherein the electronic information storage element comprises an EEPROM.

26. The liquid handling system of claim 21, wherein the electronic information retrieval element comprises a RF antenna.

27. The liquid handling system of claim 21, wherein a gap is maintained between the electronic information retrieval element and the electronic information storage element when the connector head is engaged with the cap.

28. The liquid handling system of claim 21, wherein the electronic information retrieval element is adapted to both read information from the electronic information storage element and store information to the electronic information storage element.

29. The liquid handling system of claim 21, wherein the cap comprises a frangible sealing element disposed across or adjacent to a probe receiving aperture defined in the cap.

30. The liquid handling system of claim 21, further comprising the controller and a process tool, wherein the controller is adapted to communicate with the process tool.

31. The liquid handling system of claim 30, wherein the process tool comprises an integrated circuit fabrication process tool.

32. A connector adapted for use with a liquid storage container having (i) a container opening and (ii) a cap secured to the container proximate to the container opening and including a radio frequency identification tag, the connector comprising:
   a connector head adapted to engage the cap;
   a connector probe protruding from the connector head, defining a flow passage therethrough, and adapted to be inserted through the cap into an interior portion of the container to facilitate dispensation of liquid through the flow passage; and
   an antenna adapted to receive information from the radio frequency identification tag when the connector head is engaged with the cap, and adapted to communicate with a controller arranged to control dispensation of liquid from the container in accordance with the information received.

33. The connector of claim 32, wherein the radio frequency identification tag comprises a passive radio frequency transponder.

34. The connector of claim 32, wherein the radio frequency identification tag comprises an EEPROM.

35. A liquid handling system comprising the connector of claim 32, the container, and the cap.

36. A liquid handing method utilizing a container adapted to hold a liquid and defining a container opening, utilizing a cap securable to the container proximate to the container opening and including a radio frequency identification tag, and utilizing a connector having (i) a connector head with a connector probe extending therefrom, (ii) a liquid flow passage defined through the probe, and (iii) an antenna adapted to communicate with the radio frequency identification tag when the connector head is engaged with the cap, the method comprising the steps of:
   reading from the radio frequency identification tag information about a liquid contained within the container; and
   controlling any of dispensation and use of the liquid based on information read from the radio frequency identification tag.

37. The method of claim 36, wherein the reading step includes reading by the antenna disposed at distance of less than about 10 millimeters apart from the radio frequency identification tag.

38. The method of claim 36, further comprising the step of engaging the connector with the cap.

39. The method of claim 36, wherein the controlling step includes controlling a process tool adapted to use the liquid.

40. The method of claim 39, wherein the process tool comprises an integrated circuit fabrication process tool.

41. The method of claim 36, further comprising the steps of:
   supplying a liquid to the container;
   securing the cap to the container proximate to the opening; and
   storing information about the liquid within the container in the radio frequency identification tag.

42. A liquid handling method comprising the steps of:
   receiving a connector and engaging the connector to a radio frequency identification tag-containing cap secured to a container adapted to hold a liquid and defining a container opening adjacent to the cap, the connector having a connector head including an antenna and a flow passage-defining dispensation probe extending from the head and adapted to extract liquid from the container;
   reading from the radio frequency identification tag information about a liquid contained within the container; and
   controlling any of dispensation and use of the liquid based on information read from the radio frequency identification tag.

43. The method of claim 42, wherein the reading step includes reading by the antenna disposed at distance of less than about 10 millimeters apart from the radio frequency identification tag.

44. The method of claim 42, wherein the controlling step utilizes a controller in at least intermittent communication with the antenna.

45. The method of claim 42, wherein the controlling step includes controlling a process tool adapted to use the liquid.

46. The method of claim 45, wherein the process tool comprises an integrated circuit fabrication process tool.

47. The method of claim 42, further comprising the steps of:
   supplying a liquid to the container;
   storing information about the liquid within the container in the radio frequency identification tag.

48. A liquid handling method utilizing a connector having a connector head, having a connector probe protruding from the connector head and defining a flow passage therethrough, and having an antenna adapted to communicate with a radio frequency identification tag, the method comprising the steps of:
   placing the connector probe into a container having a cap secured to the container proximate to a container opening, wherein the cap includes a radio frequency identification tag;
   engaging the connector head to the cap;
   reading from the radio frequency identification tag information about a liquid contained within the container; and
   controlling any of dispensation and use of the liquid based on information read from the radio frequency identification tag.

49. The method of claim 48, wherein the reading step includes reading by the antenna disposed at distance of less than about 10 millimeters apart from the radio frequency identification tag.

50. The method of claim 48, wherein the controlling step utilizes a controller in at least intermittent communication with the antenna.

51. The method of claim 48, wherein the controlling step includes controlling a process tool adapted to use the liquid.

52. The method of claim 51, wherein the process tool comprises an integrated circuit fabrication process tool.

53. The method of claim 48, further comprising the steps of:
   supplying a liquid to the container;
   storing information about the liquid within the container in the radio frequency identification tag.

* * * * *

UNITED STATES PATENT AND TRADEMARK OFFICE
CERTIFICATE OF CORRECTION

PATENT NO. : 7,664,568 B2   Page 1 of 1
APPLICATION NO. : 11/074408
DATED : February 16, 2010
INVENTOR(S) : Kevin T. O'Dougherty It is certified that error appears in the above-identified patent and that said Letters Patent is hereby corrected as shown below:

Title Page, Page 2, Item (56) References Cited, U.S. Patent Documents, second column, "2003/0004606" should be -- 2003/0004608 --.

Signed and Sealed this

Fourth Day of May, 2010

David J. Kappos
*Director of the United States Patent and Trademark Office*